April 21, 1959     F. DERMOND ET AL     2,883,476
INDEXING MEANS FOR DRUM-FEED SCREW TYPE
TRANSLATING DEVICE Filed May 14, 1956     3 Sheets-Sheet 1

INVENTORS F. DERMOND
C. A. NICKERSON
BY
*V. P. Griolo*
ATTORNEY

April 21, 1959   F. DERMOND ET AL   2,883,476
INDEXING MEANS FOR DRUM-FEED SCREW TYPE
TRANSLATING DEVICE Filed May 14, 1956   3 Sheets-Sheet 2

INVENTORS F. DERMOND
C. A. NICKERSON
BY

ATTORNEY

April 21, 1959  F. DERMOND ET AL  2,883,476
INDEXING MEANS FOR DRUM-FEED SCREW TYPE
TRANSLATING DEVICE
Filed May 14, 1956  3 Sheets-Sheet 3
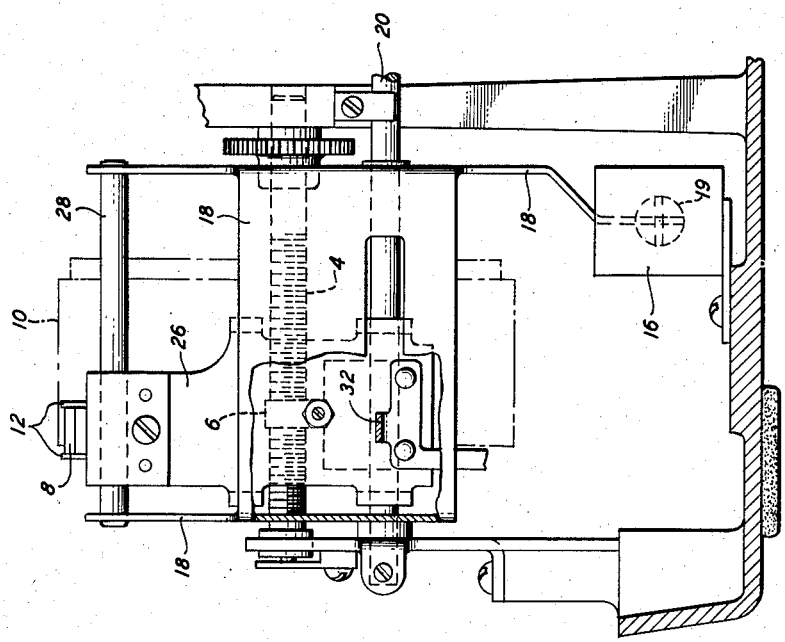
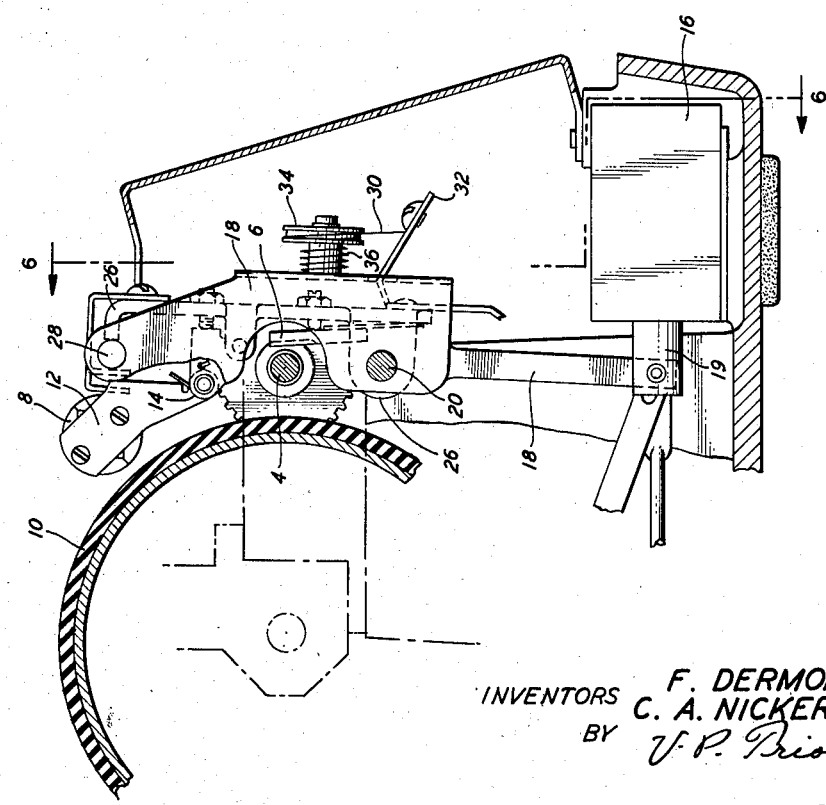
INVENTORS F. DERMOND
C. A. NICKERSON
BY
ATTORNEY United States Patent Office 2,883,476
Patented Apr. 21, 1959

2,883,476

INDEXING MEANS FOR DRUM-FEED SCREW TYPE TRANSLATING DEVICE

Franklin Dermond, Wayne Township, Passaic County, and Clifford A. Nickerson, Bernardsville, N.J., assignors to Bell Telephone Laboratories, Incorporated, New York, N.Y., a corporation of New York Application May 14, 1956, Serial No. 584,774

5 Claims. (Cl. 179—100.2)

This invention relates to signal recording and reproducing apparatus comprising a transducer and a record member actuated by a common means, particularly to record drum-feed screw type translating devices, and more particularly to means for indexing a record drum with respect to a transducer associated therewith where the gear ratio between the record drum and the transducer feed screw is greater than 1:1.

In the automatic telephone answering and recording device disclosed in patent application Serial No. 331,157, filed on January 14, 1953, now United States Patent No. 2,761,899, the record drum and transducer are indexed by means of a control signal responsive pawl member and a detent means on the drum. When the record on the drum is to be retraced from the starting point the solenoid which controls the transducer carriage half-nut and the pawl member is deenergized. This causes the half-nut to become disengaged from the lead screw, the transducer carriage to return to the starting position and the pawl member to contact the surface of the rotating drum. The pawl member eventually engages the detent means and arrests the motion of the drum and the feed screw. With the detent means properly located and the gear ratio between the drum and the feed screw 1:1, the solenoid, on being energized, will simultaneously release the pawl member and cause the half-nut to engage the thread of the feed screw at a point corresponding to the starting point of the recorded signal.

It will be readily understood that a gear ratio greater than 1:1 might be employed with particular advantage in devices of this type since it would permit the recording of a longer message on the surface of the record drum. However, with a gear ratio greater than 1:1, for example 2:1, each revolution of the drum would rotate the feed screw one-half turn and it would then be possible for the point on the feed screw thread corresponding to the starting point of the recorded signal to be 180 degrees away from the transducer carriage half-nut when the pawl member engages the detent means and the device is conditioned for reproduction of the record. In other words, the threads of the feed screw and the half-nut would be out one half (½) lead with respect to each other.

It is an object of this invention to provide means, in a system employing a gear ratio greater than 1:1, for preventing the engagement of the pawl member and drum detent means except when the point on the feed screw thread corresponding to the starting point of the recorded signal is directly under the transducer carriage half-nut.

In accordance with this invention this objective is achieved by means of an eccentric disposed in such manner as to make one revolution for each turn of the feed screw and a follower member controlled thereby affixed to the pawl member.

The nature of the invention and its distinguishing features and advantages will be more clearly understood from the following detailed description and the accompanying drawings in which:

Fig. 5 shows the position of the bail, and the transducer carriage supported thereby, when the solenoid is de-energized and the transducer and record band are not engaged; and Fig. 6 is a sectional view taken on the line 6—6 of Fig. 5.

Figure 1:
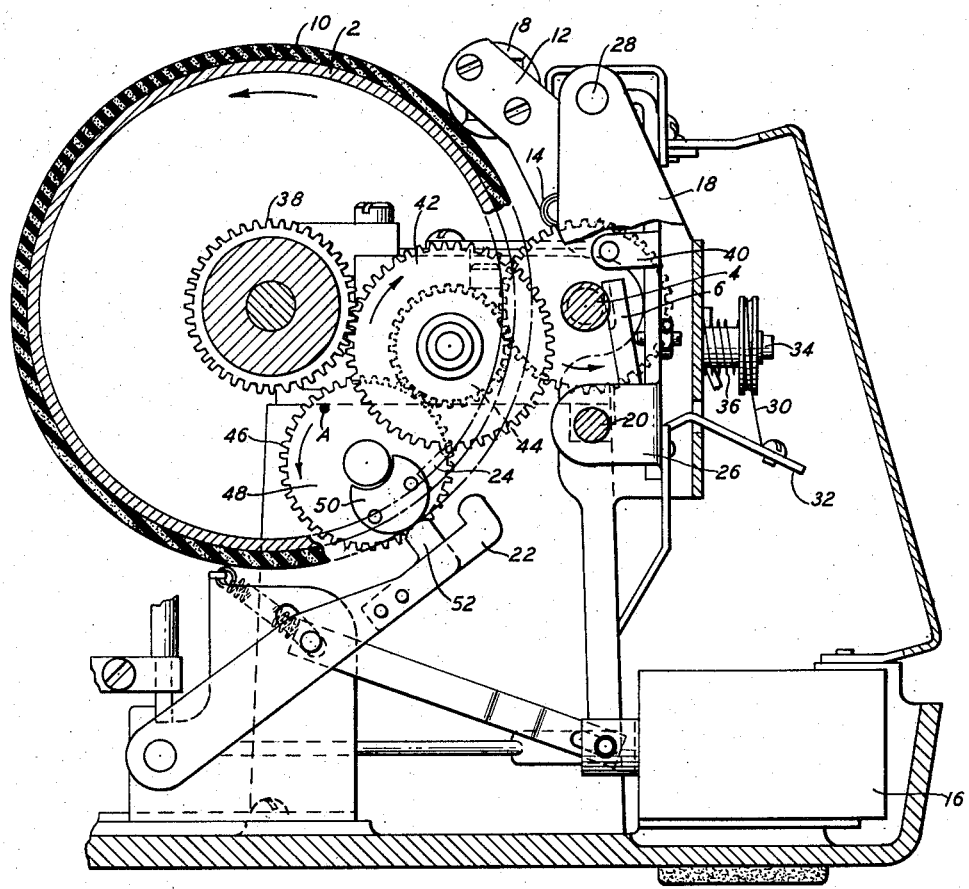
Fig. 1 is a view in side elevation, partially in section and with the driving elements removed, of a telephone answering device of the type disclosed in United States Patent No. 2,761,899, modified to include a single lobe eccentric disposed so as to exercise control over the pawl member where the gear ratio between record drum and feed screw is 2:1.

Referring now to the accompanying drawings, 2 is a drum which may be used for recording and reproducing the outgoing message or "announcement." As it rotates the lead screw 4 cooperates with the half-nut 6 to move the transducer 8 across the width of the magnetizable band 10 tracing a helical track. The transducer 8, which is held in contact with the surface of the magnetizable band during the recording and reproducing operations is mounted on a pivoted arm 12 with a spiral spring 14 applying a suitable pressure between the transducer and the magnetizable band. When the solenoid 16 is energized the bail 18, connected to armature 19, is rotated on the guide bar 20. The pawl 22 is disengaged from the detent means 24 in drum 2, allowing the drum to rotate, the half-nut 6 engages the lead screw 4 and the transducer 8 contacts the band 10. When solenoid 16 is deenergized the pawl member 22 engages the drum 2 and eventually falls into detent means 24 to arrest the motion of the drum, the bail 18 rotates to disengage the half-nut 6 and feed screw 4, and the transducer 8 and band 10.

The transducer carriage 26 is supported by and slides along the bars 20 and 28. Guide bar 28 is a component of bail 18. The half-nut 6 is a component of the carriage 26. As the transducer carriage moves from its zero position (from left to right) a cord 30 attached to an arm 32 of the carriage rotates a pulley 34 which winds up a spring 36. When half-nut 6 is disengaged from lead screw 4, spring 36 pulls carriage 26 back to its zero position.

Motion is imparted to feed screw 4 by means of the gear train which comprises gear 38 affixed to the drum 2, gear 40 affixed to feed screw 4 and gears 42 and 44 which transmit motion from gear 38 directly to gear 40 in the ratio of 3:1. Gears 42 and 44 are affixed to hub 45 which rotates on a shaft supported by frame 47. Motion is also imparted by gear 44 to the eccentric 46 which comprises gear 48 and the lobe 50. Eccentric 46 is affixed to hub 49 which rotates on a shaft also supported by frame 47. Gears 38, 40 and 48 are identical. It will be readily understood that gears 40 and 48, each driven directly by gear 44, will make the same number of revolutions in a fixed period of time and that gear 38 will make twice as many revolutions.

Lobe 50, which is affixed to gear 48, will make one-half revolution for each revolution of drum 2. Therefore, by properly locating lobe 50 with respect to detent means 24, and the follower member 52 on pawl member 22, pawl member 22 will be prevented from engaging detent means 24 on every other revolution of drum 2. With lobe 50 properly located, point A, diagonally opposite the radially most extended point of lobe 50, will correspond to the starting point of the recorded signal. When the detent means is engaged and the motion of the drum is arrested, and the transducer carriage is returned to its zero or start position, the point on the feed screw thread corresponding to the starting point of the recorded signal will be directly under the transducer carriage half-nut, and the record drum will be indexed with respect to the transducer.

Figure 2:
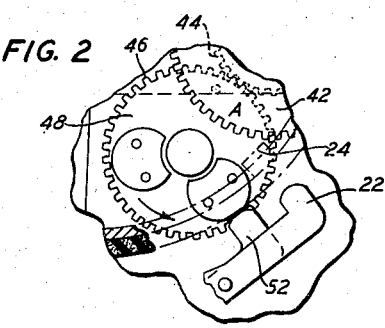
Fig. 2 is a view in side elevation of a multi-lobe eccentric for exercising control over the pawl member where the gear ratio between record drum and feed screw is 3:1.
Figure 3:
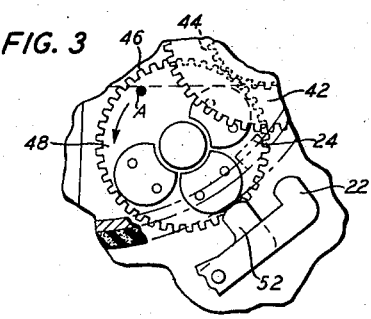
Fig. 3 is a view in side elevation of a multi-lobe eccentric for exercising control over the pawl member where the gear ratio between record drum and feed screw is 4:1.
Figure 4:
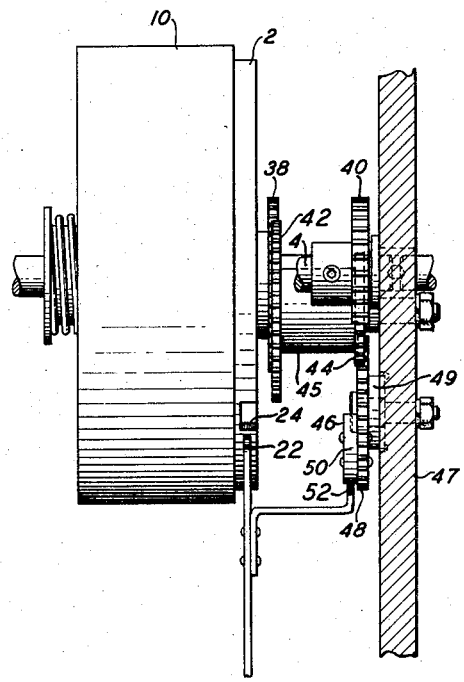
Fig. 4 is a view in front elevation of the embodiment shown in Fig. 1 with the bail and the components supported thereby removed.

The invention may be applied for any reduction or ratio between drum and feed screw as long as the ratio is a whole number. For example, as shown in Fig. 2, the drum may be indexed with respect to the transducer when the ratio is 3:1 by making the ratio of gears 42 and 44 3:1 and employing two lobes each having its radially most extended point substantially 120 degrees from point A. And, as shown in Fig. 3, the drum may be indexed with respect to the transducer when the ratio is 4:1 by making the ratio of gears 42 and 44 4:1 and employing three lobes, two of which have their radially most extended points substantially 90 degrees from point A and one of which has its radially most extended point substantially 180 degrees from point A.

It is to be understood that the above-described arrangements are illustrative of the application of the principles of the invention. Other arrangements may be devised by those skilled in the art without departing from the spirit and scope of the invention.

What is claimed is:

1. A translating device including a rotatable drum, a rotatable feed screw driven by said drum through a gear train at a speed slower than that of said drum, a transducer supporting carriage disposed to ride along said feed screw in such manner as to cause said transducer to traverse the peripheral surface of said drum from a specific starting point, said starting point being established by said drum and feed screw when they are in a predetermined relative angular position, means for arresting the rotation of said drum and feed screw comprising detent means on said drum and a control signal responsive pawl member adapted to engage said detent means, means for indexing said drum with respect to said transducer at said starting point comprising an eccentric and a follower member controlled thereby, said follower member being affixed to said pawl member, said eccentric comprising a gear rotatable by a gear in said gear train at a speed equal to that of said feed screw and a lobe disposed thereon in such manner as to permit said pawl member to engage said detent means only when said drum and feed screw are in said predetermined relative angular position.

2. A translating device comprising a rotatable drum, a rotatable feed screw driven by said drum through a gear train at a speed slower than that of said drum, a transducer supporting carriage disposed to ride along said feed screw in such manner as to cause said transducer to traverse the peripheral surface of said drum from a specific starting point, said starting point being established by said drum and feed screw when they are in a predetermined relative angular position, means for arresting the rotation of said drum and feed screw comprising detent means on said drum and a control signal responsive pawl member adapted to engage said detent means, means for indexing said drum with respect to said transducer at said starting point comprising an eccentric and a follower member controlled thereby, said follower member being affixed to said pawl member, said eccentric comprising a gear rotatable by a gear in said gear train at a speed equal to that of said feed screw and lobes disposed thereon equal in number to one less than the ratio of the speed of rotation of said drum and the speed of rotation of said feed screw, a point on said gear corresponding to said starting point, said point on said gear and said lobes being disposed circumferentially in such manner that each is substantially equidistant from the others adjacent thereto.

3. A translating device in accordance with claim 2 wherein each of said lobes comprises a radially most extended point and said points and said point on said gear corresponding to said starting point are disposed circumferentially in such manner that each is substantially equidistant from the others adjacent thereto.

4. A translating device comprising a rotatable drum, a rotatable feed screw driven by said drum through a gear train at a speed slower than that of said drum, a transducer supporting carriage disposed to ride along said feed screw in such manner as to cause said transducer to traverse the peripheral surface of said drum from a specific starting point, said starting point being established by said drum and feed screw when they are in a predetermined relative angular position, means for arresting the rotation of said drum and feed screw comprising detent means on said drum and a control signal responsive pawl member adapted to engage said detent means, means for indexing said drum with respect to said transducer at said starting point comprising an eccentric and a follower member controlled thereby, said follower member being affixed to said pawl member, said eccentric comprising a gear rotatable by a gear in said gear train at a speed equal to that of said feed screw and a single lobe disposed thereon, said lobe being disposed in such manner that a point on said gear diagonally opposite the radially most extended point of said lobe corresponds to said starting point.

5. A translating device in accordance with claim 4 wherein said drum includes a magnetizable surface and said transducer comprises a magnetic recording-reproducing head.

References Cited in the file of this patent

UNITED STATES PATENTS

| | | |
|---|---|---|
| 1,130,837 | Parnall | Mar. 9, 1915 |
| 1,234,772 | Kiewicz | July 31, 1917 |
| 2,581,499 | Roberts | Jan. 8, 1952 |
| 2,664,293 | Yerkovich | Dec. 29, 1953 |
| 2,647,752 | Barker | Aug. 4, 1953 |
| 2,761,899 | Keith et al. | Sept. 4, 1956 |
| 2,776,142 | Buhrendorf | Jan. 1, 1957 |